Figure 1:
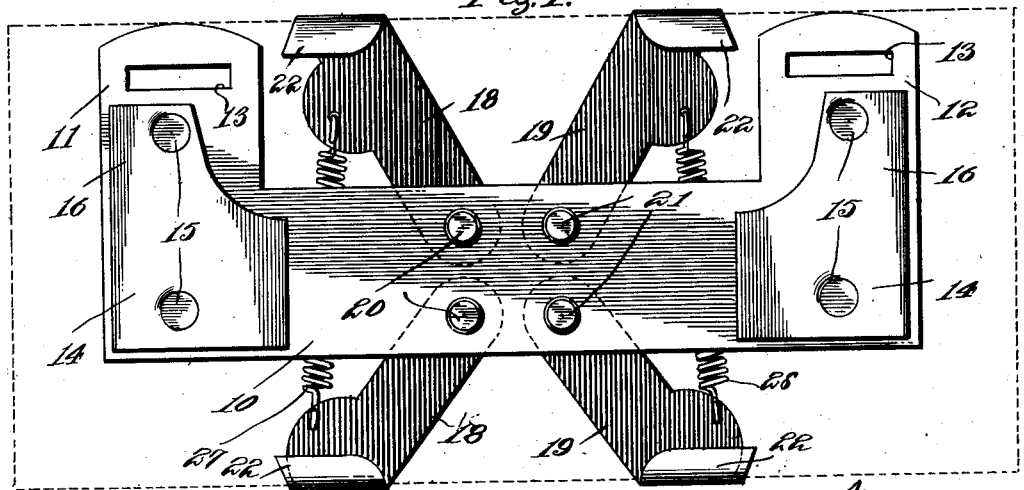

Feb. 5, 1929.

J. B. PEDEN 1,701,419

LICENSE PLATE HOLDER

Filed March 14, 1928

INVENTOR
J. B. Peden
BY
ATTORNEY

Patented Feb. 5, 1929.

1,701,419

UNITED STATES PATENT OFFICE.

JOSEPH B. PEDEN, OF JOHNSTOWN, PENNSYLVANIA.

LICENSE-PLATE HOLDER.

Application filed March 14, 1928. Serial No. 261,539.

This invention relates to a license plate holder.

An object of the invention is the provision of a plate adapted to be secured to some fixed part of an automobile provided with spring pressed pivoted arms adapted to removably engage and support a license plate in a fixed position.

A further object of the invention is the provision of a license plate holder adapted to be removably secured to some fixed part of an automobile for supporting a license plate in a predetermined position and in such a manner that the plate may be readily removed when desired, while positively retaining the plate against displacement or against loss.

This invention will be best understood from a consideration of the following detailed description in connection with the accompanying drawings; nevertheless, it is to be understood that this invention is not confined to the disclosure being susceptible of such changes and modifications as shall define no material departure from the salient features of the invention as expressed in the appended claims.

In the drawings:—

Figure 2:
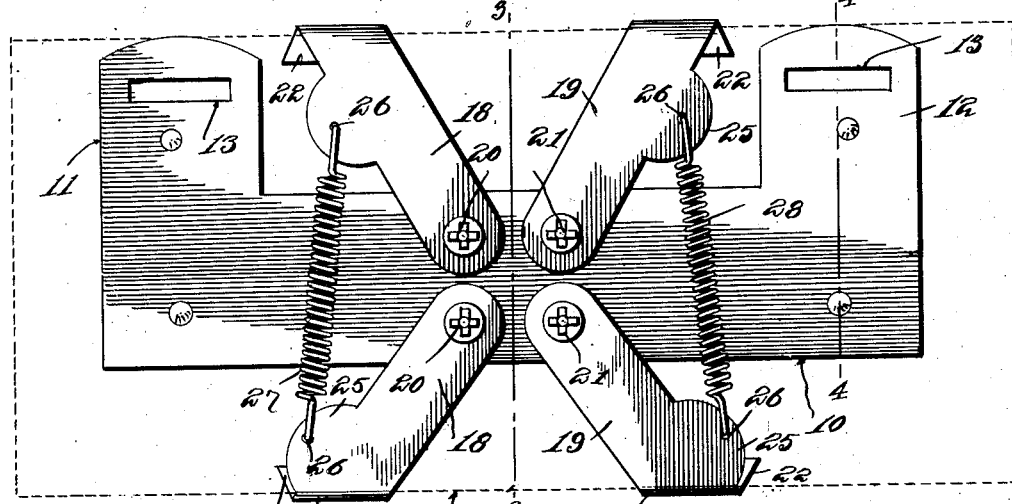
Figures 3, 4:
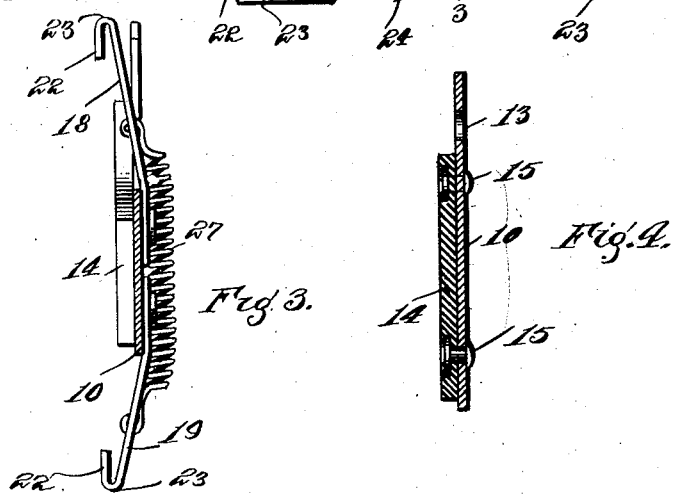

Figure 1 is a front view in elevation of a license plate holder constructed according to the principles of my invention, Figure 2 is a rear view of the same, Figure 3 is a transverse vertical section taken along the line 3—3 of Fig. 2, Figure 4 is a transverse vertical section taken along the line 4—4 of Fig. 2.

Referring more particularly to the drawings, 10 designates a base member having upstanding arms 11 and 12. Each of the arms is provided with an elongated horizontally disposed slot 13 to receive the usual attaching bolt for connecting the base member 10 to either a fixed part of the automobile, or to the usual license plate brackets.

To the front face of the base member 10 and at opposite ends thereof are secured a pair of buffers 14 by means of any approved attaching means such as rivets 15. The upper ends of the buffers, as shown at 16, are reduced and extend for a portion of the length of the arms 11 and 12.

A plurality of pairs of arms 18 and 19 are respectively pivoted at 20 and 21 to the rear of the base plate 10. The pivotal connections of these arms are arranged in the arc of a circle and closely associated with each other. Each arm has an inturned lug 22 spaced from the arm by means of a rigid portion 23. The bridging portion provides a seat for the reception of an edge of a license plate 24, as shown in dotted lines. The arms are located at an acute angle to a vertical line passing through the center of the base member 10, and the seats 23 are located at such an angle to the edge of the arms that said seats will be normally located in horizontal planes when applied to the edges of the license plate.

Each arm at the outer edge thereof is provided with a lug 25 and perforated at 26 to receive the end of a spring. A coil spring 27 of sufficient strength has its ends connected in the perforation 26 of the lugs associated with the arms 18. A coil spring 28 similar to the coil spring 27 has its ends connected with the perforations 26 of the lugs 25 forming part of the arms 19. The springs tends at all times to move the connected pairs of arms 18 and 19 away from the vertical center of the base member whereby the seats 23 will be forced in rigid relation with the edges of the plate 24.

The heads of the rivets or securing means for the buffers 14 are countersunk in said buffers so that said heads will not engage the metal of the license plate in order to eliminate any tendency towards noise. When it is desired to place a license plate on the member 10, the pairs of adjacent arms 18 and 19 of the opposite pairs are swung towards a vertical plane passing through the center of the base member 10 and the edges of the license plate are inserted on the seats 23 of said arms. When said arms are released the springs 27 and 28 will move the pairs of connected arms 18 and 19 towards each other and cause the flanges 22 and the seats 23 to frictionally and rigidly engage the edges of the plate for retaining the license plate in position. The buffers 14 are carried by the base member 10 and engage the inner face of the license plate for aiding in preventing rattling of the license plate.

I claim:—

1. A license plate holder comprising a base member, a plurality of pairs of arms pivotally connected at the inner ends thereof to the middle portion of the base member, the free ends of the arms projecting beyond the opposite edges of the base member and provided with seats to receive the edges of a license plate, springs connecting pairs of the arms together for forcing the seats into engagement with the edges of the plate, the free ends of the arms being bent laterally over an edge of the plate so that the seats will be disposed in a plane parallel to the base member, and buffers secured to a face of the base member and disposed between parallel planes passing through the base member and the seats.

2. A license plate holder comprising a base member, a plurality of pairs of arms pivotally connected at one end to the base member, the free ends of the arms projecting beyond the opposite edges of the base member and provided with seats to receive the opposite edges of the license plate, a spring connecting the free end of an arm projecting from one side of the base member with the free end of an arm projecting beyond the opposite edge of the base member.

3. A license plate holder comprising a base member, a plurality of pairs of arms pivotally connected at one end to the base member, the free ends of the arms projecting beyond the opposite edges of the base member and provided with seats to receive the opposite edges of the license plate, a spring connecting the free end of an arm projecting from one side of the base member with the free end of an arm projecting beyond the opposite edge of the base member, said base member having attaching lugs projecting from an edge of said member, a pair of the arms being movable between the lugs.

4. A license plate holder comprising a base member, a plurality of pairs of arms pivotally connected at one end to the base member, the free ends of the arms projecting beyond the opposite edges of the base member and provided with seats to receive the opposite edges of the license plate, a spring connecting the free end of an arm projecting from one side of the base member with the free end of an arm projecting beyond the opposite edge of the base member, said base member having attaching lugs projecting from an edge of said member, a pair of the arms being movable between the lugs, buffers secured to one face of the base member and extending over a portion of the attaching lugs.

JOSEPH B. PEDEN.